US012623723B2

(12) United States Patent
Schantl et al.

(10) Patent No.: US 12,623,723 B2
(45) Date of Patent: May 12, 2026

(54) UNIT MOUNTING IN A VEHICLE

(71) Applicant: AUDI AG, Ingolstadt (DE)

(72) Inventors: Gilbert Schantl, Munich (DE); Marek Bujak, Wellheim (DE); Stefan Rugies, Ingolstadt (DE); Hans-Peter Frensch, Ingolstadt (DE); Andreas Weber, Ingolstadt (DE); Korbinian Weber, Ingolstadt (DE); Thomas Wittenschläger, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 336 days.

(21) Appl. No.: 17/609,178

(22) PCT Filed: May 4, 2020

(86) PCT No.: PCT/EP2020/062297
§ 371 (c)(1),
(2) Date: Nov. 5, 2021

(87) PCT Pub. No.: WO2020/225201
PCT Pub. Date: Nov. 12, 2020

(65) Prior Publication Data
US 2022/0227422 A1    Jul. 21, 2022

(30) Foreign Application Priority Data

May 7, 2019    (DE) ..................... 10 2019 206 519.8

(51) Int. Cl.
*B62D 21/11*        (2006.01)
*B60K 5/12*         (2006.01)
*F16F 1/38*         (2006.01)
(52) U.S. Cl.
CPC ............ *B62D 21/11* (2013.01); *B60K 5/1216* (2013.01); *F16F 1/3842* (2013.01)

(58) Field of Classification Search
CPC ........ B62D 21/11; B60K 5/12; B60K 5/1208; B60K 5/1216; B60K 5/1291;
(Continued)

(56) References Cited

U.S. PATENT DOCUMENTS 1,738,532 A * 12/1929 Albert .................. B60K 5/1216
                                                        248/605
1,930,310 A * 10/1933 Geyer ..................... F16F 1/445
                                                        403/220
(Continued)

FOREIGN PATENT DOCUMENTS

DE          19909945 C1    10/2000
DE      102011078492 A1     1/2013
(Continued)

OTHER PUBLICATIONS

German Examination Report issued on Mar. 25, 2020 in corresponding German Patent Application No. 10 2019 206 519.8; 17 pages.
(Continued)

*Primary Examiner* — Vishal R Sahni
(74) *Attorney, Agent, or Firm* — Maier & Maier, PLLC

(57)    ABSTRACT

A unit mounting in a vehicle, in which a drive unit is attached via a unit bearing to a body-side bearing bracket, which unit bearing is a rubber-metal bearing having a sleeve-shaped bearing core, which is screwed together with the body-side bearing bracket by a bearing bolt guided through the sleeve-shaped bearing core. The drive unit has a unit housing, in which a bearing receptacle is formed for the unit bearing. The housing-side bearing receptacle is formed as a bearing cup open on one side having a hollow cylindrical receptacle space, specifically in particular having a closed bearing base, from which a cylindrical circumferential peripheral wall is raised.

16 Claims, 6 Drawing Sheets

(58) Field of Classification Search

CPC ........ F16F 1/3842; F16F 1/3828; F16F 1/387; F16F 1/44; F16B 5/02; F16B 5/0275

See application file for complete search history.

(56) References Cited

U.S. PATENT DOCUMENTS

| | | | | |
|---|---|---|---|---|
| 2,022,099 A * | 11/1935 | Wolfram | B60K 5/1216 | 180/89.1 |
| 2,115,458 A * | 4/1938 | Geyer | F16F 1/445 | 267/113 |
| 2,241,139 A * | 5/1941 | Julien | B64D 27/04 | 248/557 |
| 2,523,504 A * | 9/1950 | Ford, Jr. | F16F 1/3935 | 248/557 |
| 2,936,978 A * | 5/1960 | Lauck | B64D 27/12 | 60/797 |
| 4,011,021 A * | 3/1977 | Hartz | F16D 3/74 | 403/41 |
| 4,741,722 A * | 5/1988 | Federn | F16D 3/79 | 464/99 |
| 5,035,397 A * | 7/1991 | Yamada | B60K 5/1208 | 180/297 |
| 5,362,092 A * | 11/1994 | Schote | B60G 7/02 | 280/124.134 |
| 6,095,481 A * | 8/2000 | Norkus | B60G 99/004 | 248/560 |
| 6,135,469 A * | 10/2000 | Hulstein | B60G 7/02 | 280/124.13 |
| 6,321,890 B1 * | 11/2001 | Suzuki | B60K 5/1208 | 188/380 |
| 2007/0013116 A1 * | 1/2007 | Nemoto | F16F 15/02 | 180/300 |
| 2014/0367546 A1 * | 12/2014 | Hibi | F16F 1/3835 | 248/635 |
| 2016/0046347 A1 * | 2/2016 | Ishii | F16B 2/04 | 403/24 |
| 2017/0138434 A1 * | 5/2017 | Gaither | F16F 9/103 | |
| 2017/0152909 A1 | 6/2017 | Yoshii et al. | | |
| 2017/0166066 A1 * | 6/2017 | Isakiewitsch | B60L 53/12 | |
| 2021/0356014 A1 * | 11/2021 | Purreiter | F16F 1/3828 | |

FOREIGN PATENT DOCUMENTS

| | | | |
|---|---|---|---|
| DE | 102012012327 A1 | 12/2013 | |
| DE | 102013007976 A1 | 11/2014 | |
| DE | 102015002278 A1 | 1/2016 | |
| DE | 102015010507 A1 | 2/2017 | |
| DE | 102017211700 A1 * | 1/2019 | |
| GB | 392256 A | 5/1933 | |
| JP | 2012153195 A * | 8/2012 | |

OTHER PUBLICATIONS

International Preliminary Report on Patentability issued on Nov. 2, 2021 in corresponding International Application No. PCT/EP2020/062297; 14 pages.

Office Action issued on Nov. 20, 2023, in corresponding Chinese Application No. 202080033810.0, 16 pages.

* cited by examiner

UNIT MOUNTING IN A VEHICLE

FIELD

The invention relates to a unit mounting in a vehicle.

BACKGROUND

Summary

The drive unit of a vehicle, such as an internal combustion engine or an electric machine, is typically mounted in a motor compartment of the vehicle via vibration-damping unit bearings on a support structure, such as an axle support or auxiliary frame, of the vehicle body, for example, in a three-point or four-point mounting.

In a generic unit mounting, the drive unit is attached via a unit bearing to a body-side bearing bracket. The unit bearing is implemented as a rubber-metal bearing having a sleeve-shaped bearing core, which is screwed onto the body-side bearing bracket by means of a bearing bolt guided through the sleeve-shaped bearing core. The unit housing has a bearing receptacle into which the unit bearing is inserted (in particular pressed in).

In the prior art, the housing-fixed bearing receptacle can be implemented as a bearing eye open on both sides in the axial direction, which has a hollow cylindrical receptacle space into which the unit bearing is pressed. The attachment of the housing-fixed unit bearing to the bearing bracket can be implemented as follows: The bearing bracket can thus have two bracket wings which are positioned axially on both sides of the sleeve-shaped bearing core of the unit bearing. The two bracket wings and the interposed bearing core are screwed together to form an axial press group with the aid of a bearing bolt. The bearing bolt extends with its bolt shaft through the sleeve-shaped bearing core, wherein the two bracket wings and the sleeve-shaped bearing core are clamped in the axial direction between a bolt head of the bearing bolt and a screw nut, which is screwed together with the bolt shaft.

In the above prior art, the attachment of the unit bearing to the bearing bracket is linked to both installation space expenditure and component expenditure. Moreover, tool access to the unit bearing is required on both sides in the axial direction to enable installation or removal of the drive unit.

An auxiliary frame for a motor vehicle is known from DE 10 2013 007 976 A1. A subframe for a motor vehicle is known from DE 199 09 945 C1. An arrangement of an electric motor unit in the motor compartment of a motor vehicle is known from DE 10 2012 012 327 A1.

The object of the invention is to provide a unit mounting for a drive unit, in which the unit mounting is implementable with a greater number of degrees of freedom in comparison to the prior art with reduced installation space expenditure and/or with reduced component requirement in comparison to the prior art.

According to the characterizing part of the disclosure, the housing-side bearing receptacle is not implemented as a bearing eye open on both sides axially but rather as a bearing cup open on one side, specifically with a closed bearing base from which a cylindrical peripheral circumferential wall is raised. The housing-fixed bearing receptacle formed as a bearing cup provides only a one-sided installation access for inserting, in particular pressing in the unit bearing.

In a first technical implementation, the attachment of the unit bearing to the bearing bracket can be implemented as follows: The sleeve-shaped bearing core of the unit bearing can thus have an internal thread with which the bearing bolt is screwed together. In this case, a screw nut can be omitted to implement the screw connection to the unit bearing. The bearing bolt can have a bolt shaft, which can be brought into threaded engagement with the internal thread of the bearing core, and a bolt head. The bolt shaft can be guided with hole clearance through a screw hole of the bearing bracket, while the bolt head is supportable on an opening edge region of the bearing bracket screw hole facing away from the unit bearing. In this case, the bearing bracket can be clamped with its opening edge region between the bolt head and an end face (facing toward the bearing bracket) of the sleeve-shaped bearing core.

With regard to a screwing/unscrewing process of the bearing bolt that can be carried out properly, it is preferred if a rotation lock is assigned to the sleeve-shaped bearing core. With the aid of the rotation lock, the sleeve-shaped bearing core can be held in a rotationally fixed manner during the screwing/unscrewing of the bearing bolt. The rotation lock can be formed, for example, between the bearing core and the bearing bracket or alternatively between the bearing core and the unit housing, in particular as interlocking formfitting contours.

For a simple installation/removal of the drive unit into or out of the vehicle motor compartment, it is preferred if the bearing bracket is embodied in at least two parts. For example, the bearing bracket can have a body-fixed main body and an adapter part. The adapter part can be removably installed on the main body, in particular in a screw connection. It is preferred if both the bearing bracket screw hole, through which the bolt shaft is guided, and also the bearing bracket opening edge, on which the bolt head of the bearing bolt is supportable, are formed on the adapter part. In contrast thereto, neither the bearing bracket screw hole nor the bearing bracket opening edge region can be formed on the main body.

The main body can be manufactured in this case from a massive solid material which can be designed without a screw hole for the bearing bolt. Instead of this, only smaller-diameter screw holes are provided in the main body to screw the adapter part onto the main body.

The adapter part can be brought into contact with the main body of the bearing bracket at a joining plane. For example, the joining plane can extend as a vertical plane in the vehicle vertical direction. In this case, the joining plane can be oriented perpendicularly to the screw axis of the bearing bolt, which is oriented, for example, in the vehicle longitudinal direction and/or in the vehicle transverse direction. The adapter part can be screwed onto the main body using one or more screw connections. The screw axes thereof can preferably (with regard to a stable attachment) be oriented axially parallel or perpendicularly to the bearing bolt screw axis.

In one specific embodiment, the adapter part can be a shell-shaped profile part, specifically having the opening edge region as the profile base, from which a circumferential profile wall is raised, which merges radially outward into a ring flange. In this case, the adapter part can be screwed using its ring flange onto the main body, specifically while forming a bolt head installation space between the profile base of the adapter part and the joining plane. The ring flange of the adapter part can be attached with the aid of screw connections on the bearing bracket main body, the screw axes of which extend axially parallel to the bearing bolt screw axis and are arranged circumferentially distributed around this bearing bolt screw axis.

In a second technical implementation of the invention, the bolt head of the bearing bolt can no longer be positioned outside the bearing cup, but instead of this can be positioned inside the housing-fixed bearing cup, specifically in an installation space between the bearing base of the housing-side bearing cup and an end face of the sleeve-shaped bearing core facing toward the bearing base. In this case, the bolt shaft adjoining the bolt head can be guided with hole clearance through the sleeve-shaped bearing core, wherein the bearing core does not have to have an internal thread. The bearing bolt guided with hole clearance through the sleeve-shaped bearing core can be brought into thread engagement with an internally threaded drilled hole of the bearing bracket using its bolt tip protruding beyond the bearing core. In this way, an axial press group results, in which the bearing core is clamped between the bolt head and an opening edge region of the internally threaded drilled hole of the bearing bracket.

To ensure simple installation/removal of the drive unit into or out of the vehicle motor compartment, it is preferred if the above bearing bracket is constructed in a total of three parts, specifically the main body, the adapter part, and an additional clamping part, the function of which is described later. The adapter part can be attached to the main body (in particular in a screw connection) in a joining plane parallel to the bearing bolt screw axis. The joining plane can extend in this case in a horizontal plane which is spanned between the vehicle longitudinal direction and the vehicle transverse direction. The adapter part can be clamped with the aid of the screw connections between the body-fixed main body and the clamping part. For easy tool access, it is preferred if the screw axes of the screw connections are oriented perpendicularly to the bearing bolt screw axis.

Two exemplary embodiments are described hereinafter on the basis of the appended drawings.

BRIEF DESCRIPTION OF THE FIGURES

In the figures:

FIG. 7 shows a view corresponding to FIGS. 1 to 3 according to a second exemplary embodiment.

DETAILED DESCRIPTION

Figure 1:
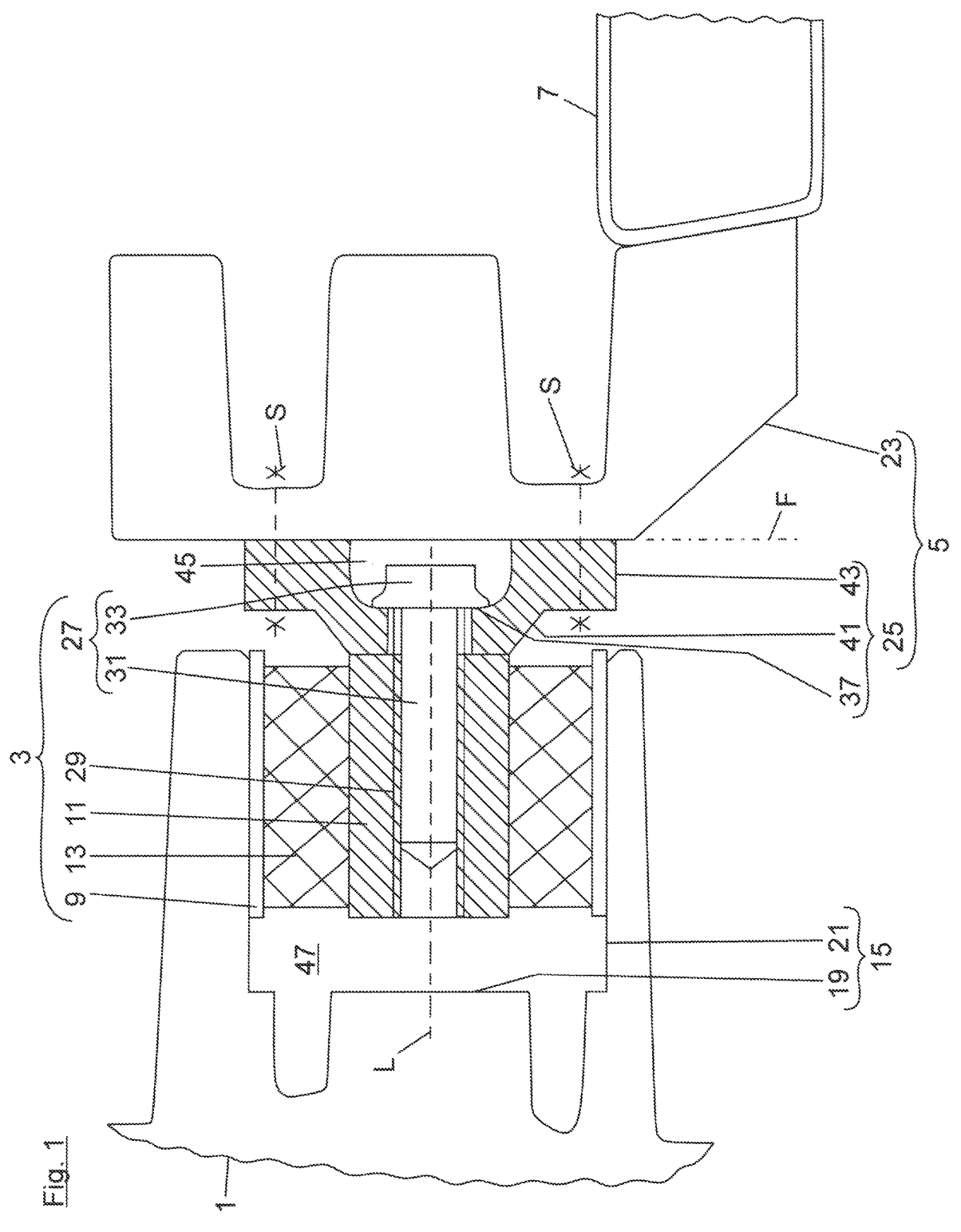
FIG. 1 shows a unit mounting according to a first exemplary embodiment.

A unit mounting is shown in FIG. 1, in which a drive unit is installed using its unit housing 1 via a unit bearing 3 designed as a rubber-metal bearing on a body-side bearing bracket 5. The bearing bracket 5 is fastened in FIG. 1 on an indicated auxiliary frame 7. The auxiliary frame 7 is in turn attached to the vehicle body (not shown) of the vehicle. The unit bearing 3 has a housing-fixed radially outer bearing sleeve 9 and a radially inner sleeve-shaped bearing core 11 as the body-side bearing component. An elastomer body 13 is vulcanized in between the radially inner bearing core 11 and the radially outer bearing sleeve. In FIG. 1, the outer bearing sleeve 9 of the unit bearing 3 is pressed into a bearing cap 15, which is formed from the same material and in one piece on the unit housing 1. The bearing cup 15, which is formed rotationally symmetrical around a bearing axis L, has a hollow cylindrical receptacle space 17 (FIG. 2), which is delimited by a closed bearing base 19 and by a cylindrically circumferential peripheral wall 21 raised therefrom.

In FIG. 1, the bearing bracket 5 is embodied in two parts, specifically having a main body 23 attached to the auxiliary frame 7 and an adapter part 25. The attachment of the bearing bracket 5 on the unit bearing 3 is implemented according to FIG. 1 with the aid of a bearing bolt 27, which screws the bearing bracket 5 onto the unit bearing 3. For this purpose, the bearing bolt 27 is in thread engagement with an internal thread 29 of the sleeve-shaped bearing core 11.

In FIG. 1, the bearing bolt 27 has a shaft 31 in thread engagement with the internal thread 29 of the bearing core 11 and a bolt head 33. The bolt shaft 31 is guided in FIG. 1 with hole clearance through a screw hole 35 (FIG. 2) of the adapter part 25, while the bolt head 33 is supported on an opening edge region 37 of the screw hole 35 of the adapter part 25 facing away from the unit bearing 3. The bearing bracket 5 is therefore supported with its opening edge region 37 between the bolt head 33 and an end face 39 of the sleeve-shaped bearing core 11.

As can furthermore be seen from FIG. 1, the adapter part 35 is a shell-shaped profile part, specifically having the opening edge region 37 as the profile base, from which a circumferential profile wall 41 is raised. The circumferential profile wall 41 merges radially outward into a ring flange 43, which in FIG. 1 is in contact with the main body 23 in a vertical joining plane F. In FIG. 1, the joining plane F is positioned perpendicularly to the bearing axis L. The adapter part 25 is screwed onto the main body 23 using its ring flange 43 via screw connections S. The screw axes of these screw connections S are oriented axially parallel to the bearing bolt screw axis L in FIG. 1. Moreover, the screw connections S are positioned circumferentially distributed on the ring flange 43 of the adapter part 25. In FIG. 1, an installation space 45, in which the bolt head 33 is positioned, is provided between the joining face F and the profile base (that is to say the opening edge region 37) of the adapter part 25.

Figure 2:
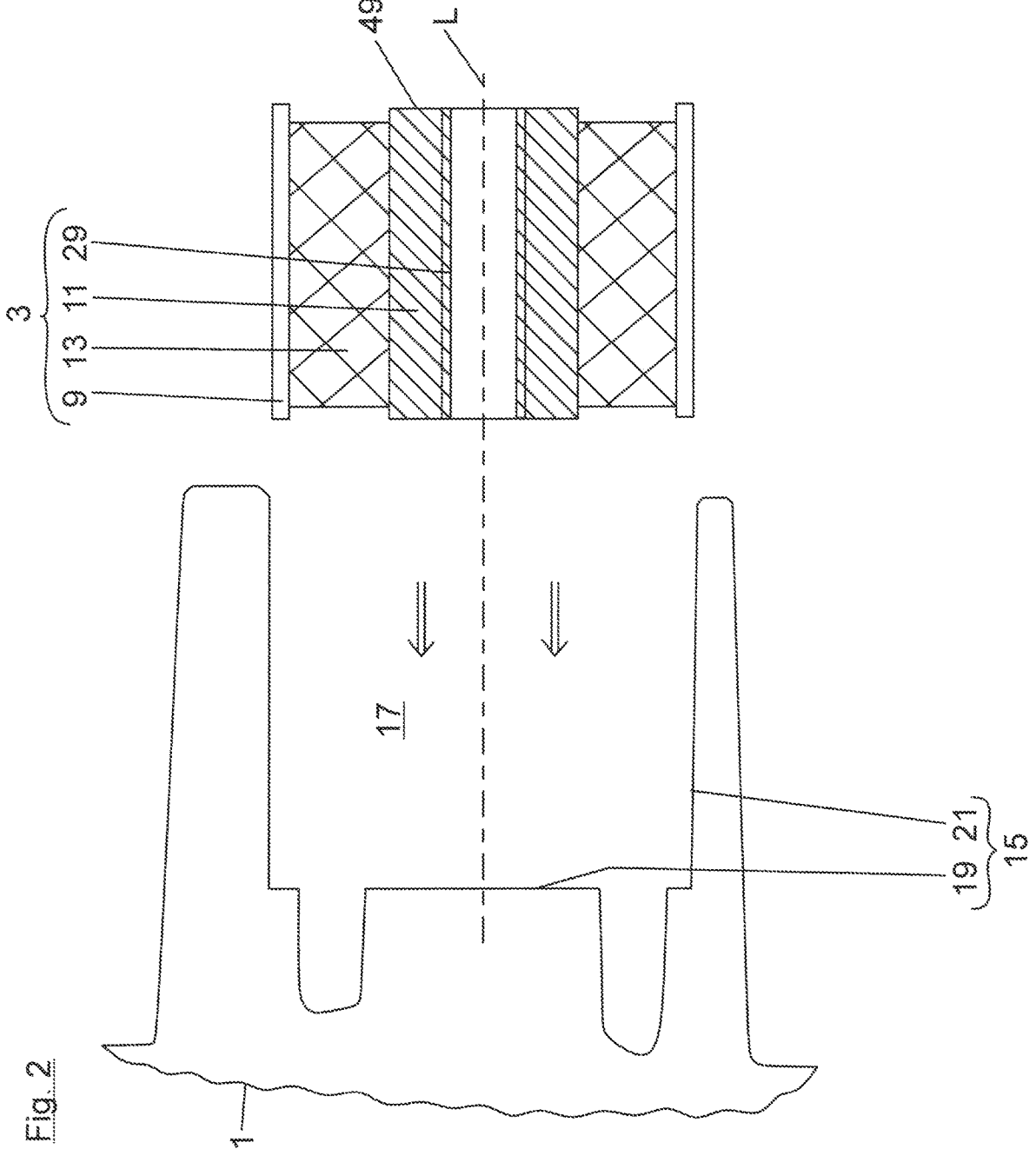
FIG. 2 shows a view which illustrate an assembly process of the unit mounting.
Figure 3:
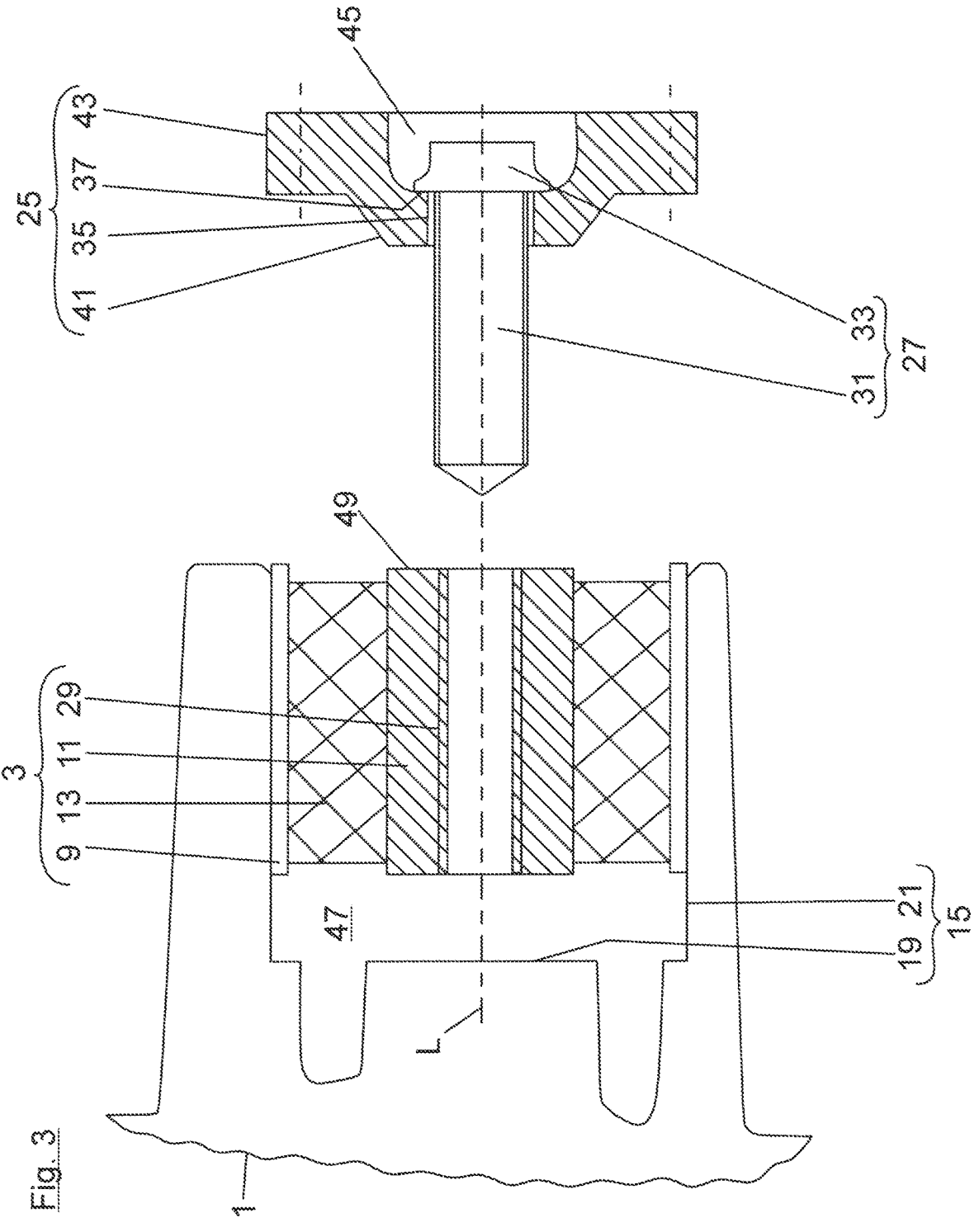
FIG. 3 shows a view which illustrate an assembly process of the unit mounting.

An assembly process of the unit mounting shown in FIG. 1 is described hereinafter on the basis of FIGS. 2 and 3. Firstly, the unit mounting 3 is pressed into the bearing cup 15 of the unit housing 1 (FIG. 2). Subsequently, the adapter part 25 is clamped on the unit bearing 3 by screwing the bearing bolt 27 into the internal thread 29 of the sleeve-shaped bearing core 11 (FIG. 3). After the pressing in process, the drive unit is positioned with respect to the bearing bracket main body 23 so that the adapter part 25 can be screwed onto the bearing bracket main body 23.

Figure 4:
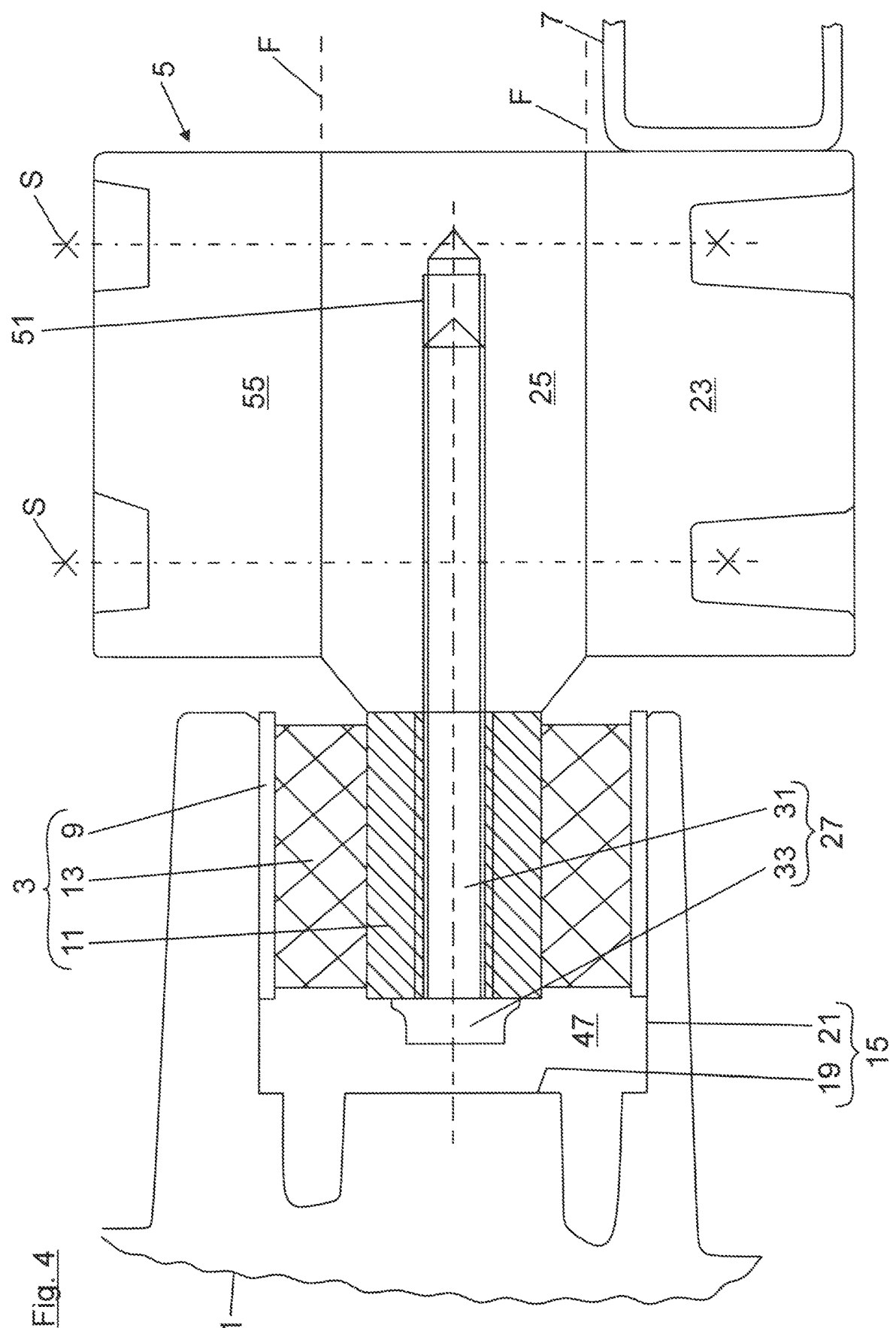
FIG. 4 shows a view corresponding to FIGS. 1 to 3 according to a second exemplary embodiment.

A second exemplary embodiment is shown in FIG. 4, in which the bolt head 33 of the bearing bolt 27 is no longer positioned outside the housing-fixed bearing cup 15, but rather is arranged in an installation space 47 between the bearing base 19 and an end face of the sleeve-shaped bearing core 11 facing toward the bearing base. The bolt shaft 31 is guided with hole clearance through the sleeve-shaped bearing core 11 in FIG. 4. In contrast to the first exemplary embodiment, in FIG. 4, the sleeve-shaped bearing core 11 is not embodied having an internal thread 29.

As can furthermore be seen from FIG. 4, the bearing bolt 27 is brought into thread engagement with an internally threaded drilled hole 51 of an adapter part 25 of the bearing bracket 5 using its bolt tip protruding beyond the sleeve-shaped bearing core 11. An axial press group thus results, in which the sleeve-shaped bearing core 11 is clamped between the bolt head 33 and an opening edge region 53 of the internally threaded drilled hole 51 of the adapter part 25 of the bearing bracket 11.

In FIG. 4, the bearing bracket 5 is constructed in a total of three parts, specifically having the main body 23, the adapter part 25, and an additional clamping part 55, which are all connected to one another via horizontal joining planes F. The adapter part 25 is thus attached to the main body 23 (with the aid of screw connections S) in FIG. 4 in a joining plane F parallel to the bearing bolt screw axis L. As mentioned above, the respective joining plane F is a horizontal plane which is spanned between a vehicle longitudinal direction x and a vehicle transverse direction y. The adapter part 25 is clamped in FIG. 4 with the aid of screw connections S between the main body 23 and the clamping part 55. The screw axes of the screw connections S are oriented perpendicularly to the bearing bolt screw axis L in FIG. 4.

Figure 5:
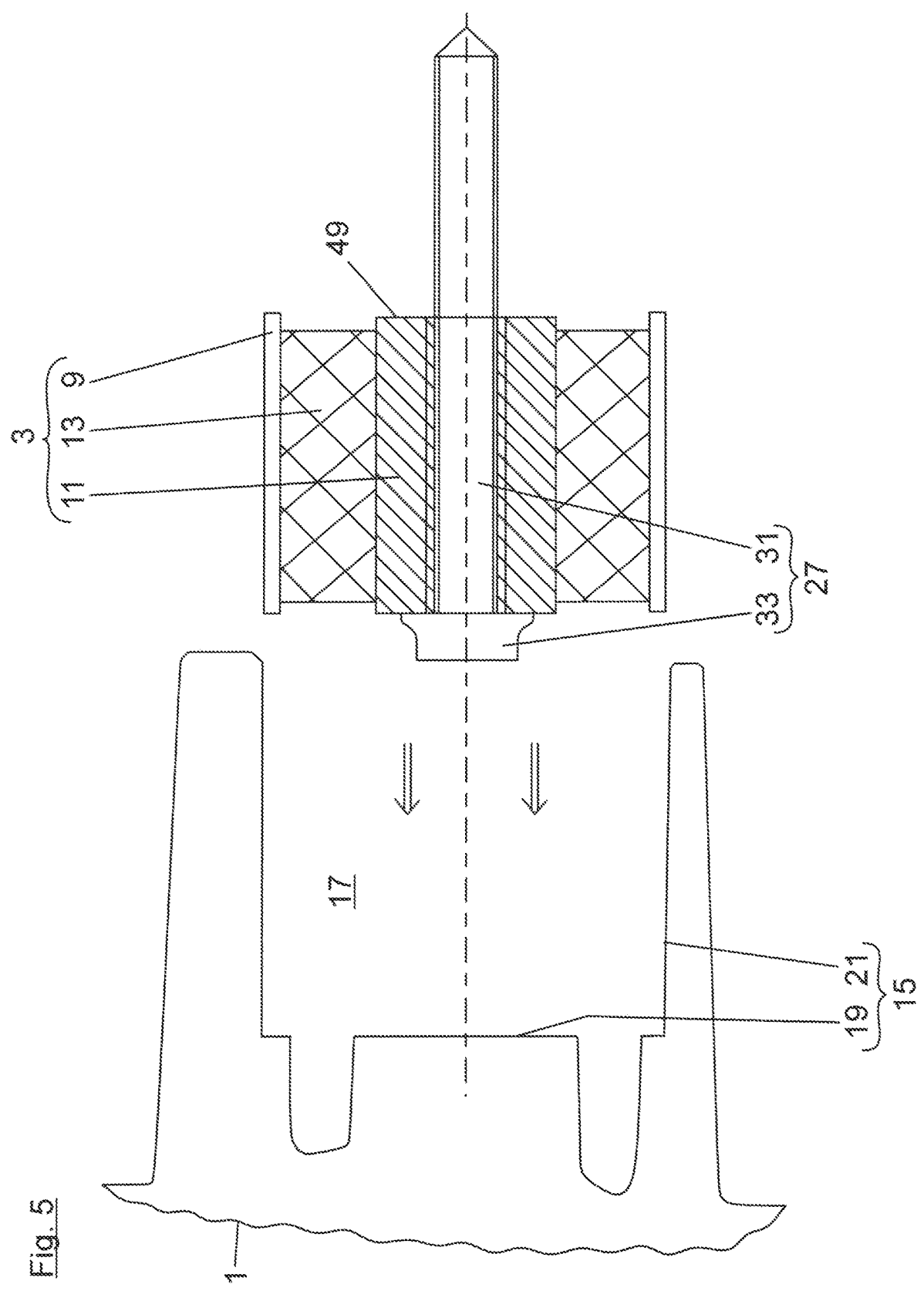
FIG. 5 shows a view corresponding to FIGS. 1 to 3 according to a second exemplary embodiment.
Figure 6:
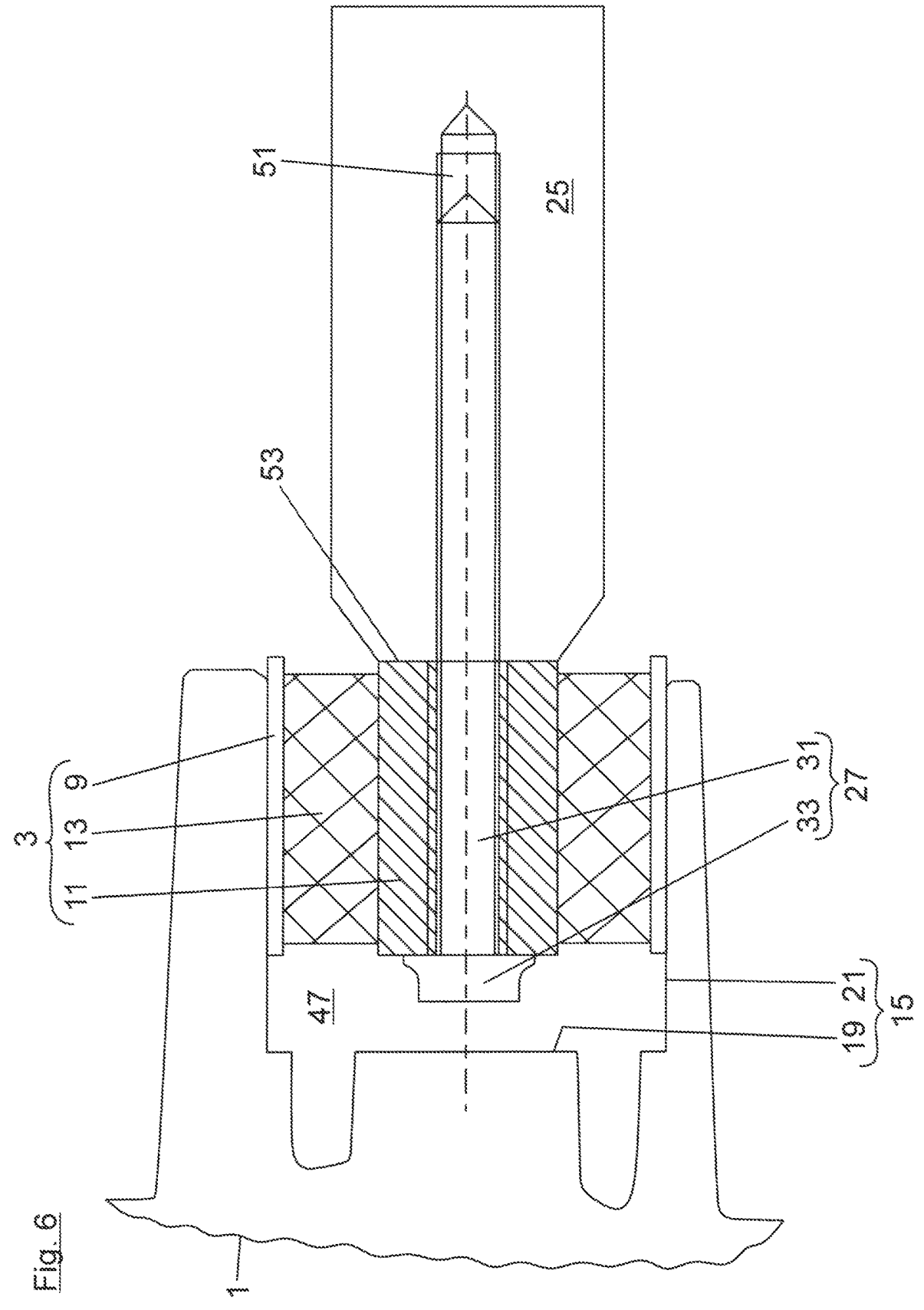
FIG. 6 shows a view corresponding to FIGS. 1 to 3 according to a second exemplary embodiment.

An assembly process of the unit mounting shown in FIG. 4 is described hereinafter on the basis of FIGS. 5 to 6: Accordingly, firstly the bearing bolt 27 is guided loosely through the unit bearing 3 (FIG. 5). Subsequently, the unit bearing 3 is pressed into the hollow cylindrical receptacle space 17 of the housing-side bearing cup 15 (FIG. 5). In a following process step, the adapter part 25 (separately from the main body 23 and the clamping part 55 of the bearing bracket 5) is screwed together with the bolt tip of the bearing bolt 27 protruding beyond the unit bearing 3 (FIG. 6). The axial press group shown in FIG. 6 thus results, in which the sleeve-shaped bearing core 11 is clamped between the bolt head 33 and the opening edge region 53 (FIG. 6) of the internally threaded drilled hole 51 of the adapter part 25. In a further process step, the adapter part 25 is clamped between the main body 23 of the bearing bracket 5 and the clamping part 55 with the aid of the screw connections S (FIG. 4).

LIST OF REFERENCE SIGNS

1 unit housing
3 unit bearing
5 bearing bracket
7 auxiliary frame
9 outer sleeve
11 bearing core
13 elastomer body
15 bearing cup
17 hollow cylindrical receptacle space
19 bearing base
21 circumferential wall
23 main body
25 adapter part
27 bearing bolt
29 internal thread
31 bolt shaft
33 bolt head
35 screw hole
37 opening edge region
39 end face of the bearing core
41 profile wall
43 ring flange
45 installation space
47 installation space
49 end face of the bearing core
51 internally threaded drilled hole
53 opening edge region
55 clamping part
F joining plane
S screw connections

The invention claimed is:

1. A unit mounting in a vehicle comprising:
a drive unit attached via a unit bearing to a body-side bearing bracket, wherein the unit bearing is a rubber-metal bearing having a sleeve-shaped bearing core, which is screwed together by an internal thread with the body-side bearing bracket by a bearing bolt guided through the sleeve-shaped bearing core, a shaft of the bearing bolt is configured to engage with the internal thread of the sleeve-shaped bearing core and a bolt head, the body-side bearing bracket comprises a main body and an adapter part configured to be screwed onto the main body using a ring flange, wherein a circumferential profile wall raised from an opening edge region of a screw hole of the adapter part merges radially outward into the ring flange;
a unit housing;
a bearing cup that is closed on a first side and open on a second side and configured to provide one-sided installation access, the first side being opposite to the second side, wherein an outer bearing sleeve of the unit bearing is pressed into the first side of the bearing cup, which is formed from a same material and in one piece on the unit housing, and the bearing cup further comprises a hollow cylindrical space delimited by both a closed bearing base and a cylindrical circumferential peripheral wall raised from the closed bearing base.

2. The unit mounting as claimed in claim 1, wherein the shaft of the bearing bolt is further configured to be guided with hole clearance through the screw hole of the adapter part, the bolt head is supported on the opening edge region of the screw hole facing away from the unit bearing, and the body-side bearing bracket is clamped with the opening edge region between the bolt head and an end face of the sleeve-shaped bearing core.

3. The unit mounting as claimed in claim 1, wherein a rotation lock is assigned to the sleeve-shaped bearing core, by which the sleeve-shaped bearing core is configured to remain rotationally fixed during the screwing/unscrewing of the bearing bolt, and the rotation lock is formed between the bearing core and the body-side bearing bracket as a form-fitting contour.

4. The unit mounting of claim 1, wherein the body-side bearing bracket is detachably installed, in a screw connection, on the main body and the bolt head is supported on the opening edge region of the screw hole of the adapter part.

5. The unit mounting as claimed in claim 4, wherein screw axes of screw connections of the adapter part onto the main body are oriented axially parallel to a bearing axis.

6. The unit mounting as claimed in claim 5, wherein the adapter part is a shell-shaped profile part, having the opening edge region as a profile base, and the screw connections are circumferentially distributed on the ring flange.

7. The unit mounting as claimed in claim 5, wherein an installation space for the bolt head of the bearing bolt is provided between the adapter part and the main body.

8. The unit mounting as claimed in claim 1, wherein the bolt head of the bearing bolt is arranged in an installation space between a joining face and the opening edge region, and a bolt shaft of the bearing bolt is configured to be guided with hole clearance through the screw hole of the adapter part.

9. The unit mounting as claimed in claim 8, wherein the body-side bearing bracket further comprises:
  a clamping part, wherein the main body, the adapter part, and the clamping part are connected by a horizontal joining plane parallel to a bearing bolt screw axis.

10. The unit mounting as claimed in claim 2, wherein a rotation lock is assigned to the sleeve-shaped bearing core, by which the sleeve-shaped bearing core is configured to remain rotationally fixed during the screwing/unscrewing of the bearing bolt, and the rotation lock is formed between the bearing core and the body-side bearing bracket as a form-fitting contour.

11. The unit mounting of claim 2, wherein the body-side bearing bracket is detachably installed, in a screw connection, on the main body, and the bolt head is supported on the opening edge region of the screw hole of the adapter part.

12. The unit mounting of claim 3, wherein the body-side bearing bracket is detachably installed in a screw connection on the main body, and the bolt head is supported on the opening edge region of the screw hole of the adapter part.

13. The unit mounting as claimed in claim 6, wherein an installation space for the bolt head of the bearing bolt is provided between the adapter part and the main body.

14. The unit mounting as claimed in claim 2, wherein the bolt head of the bearing bolt is arranged in an installation space between a joining face and the opening edge region.

15. The unit mounting as claimed in claim 1, wherein a rotation lock is assigned to the sleeve-shaped bearing core, by which the sleeve-shaped bearing core is configured to remain rotationally fixed during the screwing/unscrewing of the bearing bolt, and the rotation lock is formed between the bearing core and the unit housing as a formfitting contour.

16. The unit mounting as claimed in claim 2, wherein a rotation lock is assigned to the sleeve-shaped bearing core, by which the sleeve-shaped bearing core is configured to remain rotationally fixed during the screwing/unscrewing of the bearing bolt, and the rotation lock is formed between the bearing core and the unit housing as a formfitting contour.

* * * * *